(12) United States Patent
Lopez et al.

(10) Patent No.: US 10,140,185 B1
(45) Date of Patent: Nov. 27, 2018

(54) EPOCH BASED SNAPSHOT SUMMARY

(71) Applicant: Maginatics LLC, Mountain View, CA (US)

(72) Inventors: Julio Lopez, Mountain View, CA (US); Thomas Manville, Mountain View, CA (US)

(73) Assignee: Maginatics LLC, Mountain View, CA (US)

( * ) Notice: Subject to any disclaimer, the term of this patent is extended or adjusted under 35 U.S.C. 154(b) by 450 days.

(21) Appl. No.: 14/675,474

(22) Filed: Mar. 31, 2015

(51) Int. Cl.
*G06F 11/14* (2006.01)
*G06F 17/30* (2006.01)

(52) U.S. Cl.
CPC .... *G06F 11/1448* (2013.01); *G06F 17/30085* (2013.01); *G06F 17/30203* (2013.01); *G06F 17/30876* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 8,423,733 B1* | 4/2013 | Ozdemir | ............... | G06F 3/0604 711/162 |
| 2004/0117572 A1* | 6/2004 | Welsh | ................ | G06F 11/1451 711/162 |
| 2004/0153458 A1* | 8/2004 | Noble | ................ | G06F 11/1464 |
| 2014/0089264 A1* | 3/2014 | Talagala | ............. | G06F 11/1471 707/649 |
| 2014/0101113 A1* | 4/2014 | Zhang | ................ | G06F 11/1453 707/692 |
| 2014/0344222 A1* | 11/2014 | Morris | ............. | G06F 17/30215 707/634 |
| 2016/0034370 A1* | 2/2016 | Nanduri | ............. | G06F 11/1092 714/6.22 |

* cited by examiner

*Primary Examiner* — Alex Gofman
*Assistant Examiner* — Umar Mian
(74) *Attorney, Agent, or Firm* — Van Pelt, Yi & James LLP

(57) ABSTRACT

Epoch-based management of file system data is disclosed. In various embodiments, for each of a plurality of snapshots, data that associates with the snapshot a corresponding last chunk identifier assigned as of a time at which the snapshot is or was created is stored a in a first data structure. For each of a plurality of chunks of file system data no longer referenced by any live file system object, an epoch identifier associated with an epoch in which the chunk became no longer referenced by any live file system object is stored in a second data structure. A chunk identifier and associated epoch comprising an entry in the second data structure are compared with one or more entries in the first data structure to determine whether a chunk associated with the chunk identifier is associated with a snapshot that continues to be retained.

17 Claims, 16 Drawing Sheets

1202 —

| epoch | last chunk id |
|---|---|
| 15 | 900 |
| 16 | 1000 |
| ... | |
| 22 | 1740 |
| ... | |
| 25 | 2000 |
| 26 | 2200 |
| ... | |

1240 —

| chunk id | epoch at death |
|---|---|
| 800 | 23 |
| 1007 | 24 |
| ... | |
| 1200 | 26 |
| ... | |
| 1800 | 28 |
| 1840 | 28 |
| 2107 | 26 |
| ... | |

1202

| epoch | last chunk id |
|---|---|
| 15 | 900 |
| 16 | 1000 |
| ... | |
| 22 | 1740 |
| ... | |
| 25 | 2000 |
| 26 | 2200 |
| ... | |
| | |

1240

| chunk id | epoch at death |
|---|---|
| 800 | 23 |
| 1007 | 24 |
| ... | |
| 1200 | 26 |
| ... | |
| 1800 | 28 |
| 1840 | 28 |
| 2107 | 26 |
| ... | |

FIG. 12

EPOCH BASED SNAPSHOT SUMMARY

BACKGROUND OF THE INVENTION

Files comprising a file system, or separately-stored portions thereof (e.g., segments or "chunks"), may become subject to being deleted, e.g., once they are no longer referenced by any live file system object. For example, file segments stored in a cloud-based or other object store may become subject being deleted if the file(s) with which the segments are associated are deleted from the file system.

A reference count may be used to ensure a segment (chunk) is retained at least so long as at least one file or other file system object references the segment. Even once the reference count has been decremented to zero, however, it may be necessary to retain a segment (chunk). For example, a chunk that is no longer referenced by any live file system object may still need to be retained, e.g., because the segment (chunk) was referenced by a file or other object at the time a snapshot or backup that is still being retained was created.

BRIEF DESCRIPTION OF THE DRAWINGS

Various embodiments of the invention are disclosed in the following detailed description and the accompanying drawings.

FIG. 12 is a block diagram illustrating an example of data structures used to keep track of the relationship between file segments (chunks) and snapshots in an embodiment of a distributed file system.

DETAILED DESCRIPTION

Figure 1:
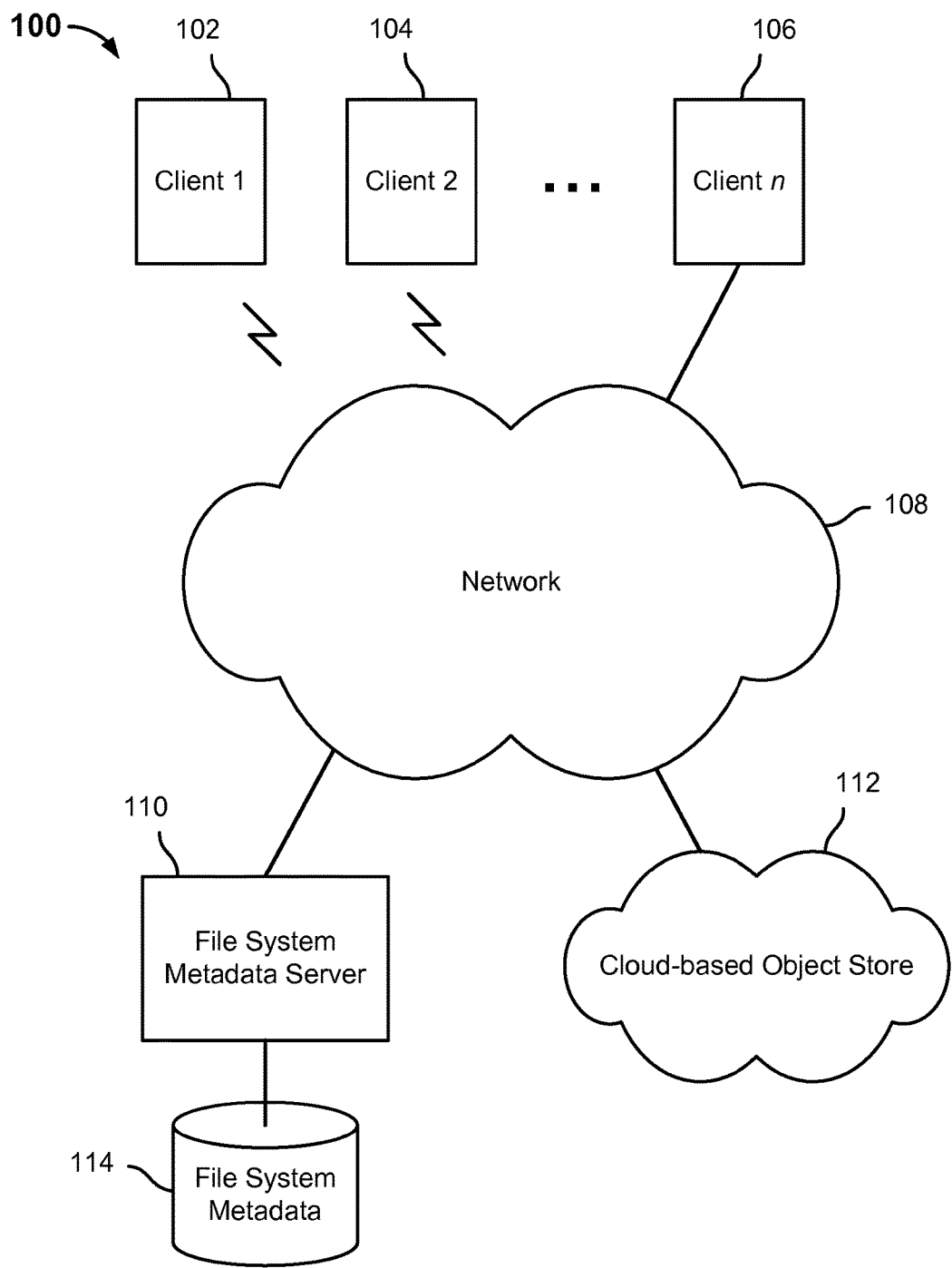
FIG. 1 is a block diagram illustrating an embodiment of a distributed file system and environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Epoch-based management of distributed file system data associated with currently-stored snapshots is disclosed. In various embodiments, monotonically increasing file segment (sometimes referred to herein as "chunks") identifiers, e.g., a "chunk id", is assigned to each new chunk of file data stored in an object store, e.g., a cloud-based object store, used to store files and other objects stored in the distributed file system. In various embodiments, files are stored by breaking them into segments or "chunks", and storing each chunk as an immutable object. Subsequent changes to a file are stored by storing modified data as a new object (i.e., chunk).

In various embodiments, an "epoch" table or other data structure is used to store for each period between snapshots an associated epoch number and for each a corresponding highest (last) "chunk id" used up to the time the snapshot was taken. Chunks with identifiers less than or equal to the value stored in the epoch table can be determined on that basis to have been created and stored prior to the snapshot, whereas chunks with identifiers greater than the value stored in the epoch table can be determined on that basis to have been created and stored subsequent to the snapshot. In various embodiments, a "death" table or other data structure is used to store for each of at least a subset of chunks that may be subject to deletion, e.g., by virtue of no longer being referenced by any live file or object, a corresponding epoch in which the chunk was determine to no longer be referenced by any file. In various embodiments, the epoch table and the death table may be used together to determine for any given chunk that may be subject to deletion should (continue to) be retained by virtue of having been live in the file system at a time when a snapshot that is still being stored was created.

FIG. 1 is a block diagram illustrating an embodiment of a distributed file system and environment. In the example shown, the distributed file system environment 100 includes a plurality of client systems and/or devices, represented in FIG. 1 by clients 102, 104, and 106. In the example shown, the clients connect (wireless or otherwise) to a network 108, e.g., one or more of a local area network (LAN), a wide area network (WAN), the Internet, and/or one or more other public and/or private networks. The clients have access via network 108 to a file system metadata server 110. Applications on the respective clients, such as clients 102, 104, and 106, make file system calls, which result in various embodiments in corresponding remote calls being made to file system metadata server 110. For example, a file system client, agent, or other entity on the client may intercept or otherwise receive calls by the application to a local (e.g., native) file system, and may redirect such calls to an agent configured to make corresponding remote calls to file system metadata server 110 (e.g., transparently to the application).

In the example shown, data comprising objects stored in the file system, such as files, is stored in a cloud-based object store 112. In some embodiments, files may be segmented into a plurality of segments or "chunks", each of which is stored in a corresponding location in the cloud-based object store. File system calls are made to file system metadata server 110, which stores file system metadata in a file system metadata storage 114, e.g., in a database or other data store. File system metadata server 110 may store in file system metadata store 114, for example, a segment or "chunk" map for each file or other object stored and represented in the file system. For example, for each file name (e.g., pathname) the file system metadata server 110 may store in a corresponding segment map a hash or other representation of each segment, and for each a corresponding location in which the segment is (or is to be) stored in cloud-based object store 112. Other file system metadata, such as metadata typically stored by a file system, may be stored by file system metadata server 110 in file system metadata store 114. Examples include, without limitation, a directory, file, or other node/object name; an identification of parent and/or child nodes; a creation time; a user that created and/or owns the object; a time last modified and/or other time; an end-of-file (EOF) or other value indicative of object size; security attributes such as a classification, access control list, etc.; and/or other file system metadata.

While in the example shown in FIG. 1 the file system metadata server 110 and the cloud-based object store 112 are shown as separate systems, located in different networks and/or physical locations, in other embodiments the file system metadata and file system content data may be stored together, e.g., both on cloud-based resources and/or both on enterprise or other network servers, etc.

Figure 2:
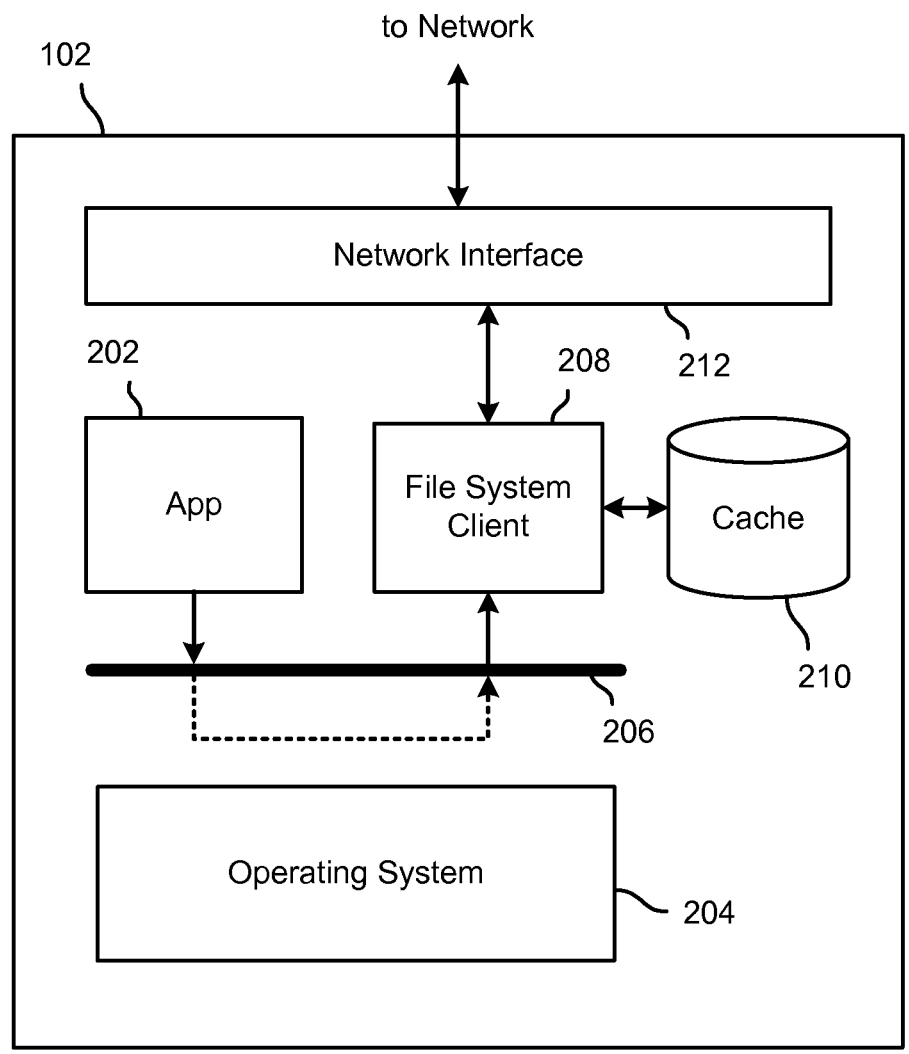
FIG. 2 is a block diagram illustrating an embodiment of a client system.

FIG. 2 is a block diagram illustrating an embodiment of a client system. In the example shown, the client system/device 102 of FIG. 1 is shown to include an application 202 running in an environment provided by an operating system 204. The operating system 204 includes a kernel (not shown) and other components configured to provide services and/or functionality to applications such as application 202. For example, operating system 204 may include and/or be configured to provide access to a native file system (not shown) of client system 102. Application 202 may be configured to make file system calls to the native file system, e.g., to store files or other objects created by/using application 202, to modify, move, or delete such objects, etc. In the example shown, file system calls made by application 202, represented in FIG. 2 by the downward pointing arrow originating in the block labeled "app" (202), are intercepted by a kernel module (or other component) 206 and redirected to a file system client (or other file system agent) 208. In some embodiments, file system agent 208 comprises a client application running in user space. In some embodiments, file system agent 208 comprises a kernel or other operating system component or module. File system client 208 in this example has associated therewith a local cache 210. In various embodiment, cache 210 may be used to buffer and/or otherwise stage file data prior to its being sent to remote storage (e.g., cloud-based object store 112 of FIG. 1), and/or to facilitate access to data stored previously but to which access may be requested later.

The client system 102 includes a network communication interface 212 that provides network connectivity, e.g., to a network such as network 108 of FIG. 1. For example, a request from app 202 to access a file stored remotely in various embodiments may result in file system client 208 making a remote call, via network communication interface 212, for example to a file system metadata server such as server 110 of FIG. 1.

In various embodiments, file system client 208 may be configured to store in a metadata write buffer comprising or otherwise associated with file system client 208 and/or cache 210 one or more file system operations and/or requests affecting file system metadata comprising a portion of the file system metadata with respect to which a file system metadata write lease is held by file system client 208. For example, file system operations affecting metadata may be buffered as received, e.g., as a result of local file system calls by applications such as application 202 of FIG. 2, and may be communicated to the remote file system metadata server asynchronously and/or upon occurrence of an event, e.g., receipt of an indication that a metadata write lease "break" event has been received and/or has occurred. For example, a second client system may indicate a desire and need to perform operations affecting a portion of the file system metadata with respect to which a first client system holds a lease, result in a "break" communication being sent to the first client system, which in turns "flushes" at least those operations in the buffer that affect the portion of metadata with respect to which the lease had been held.

Figure 3:
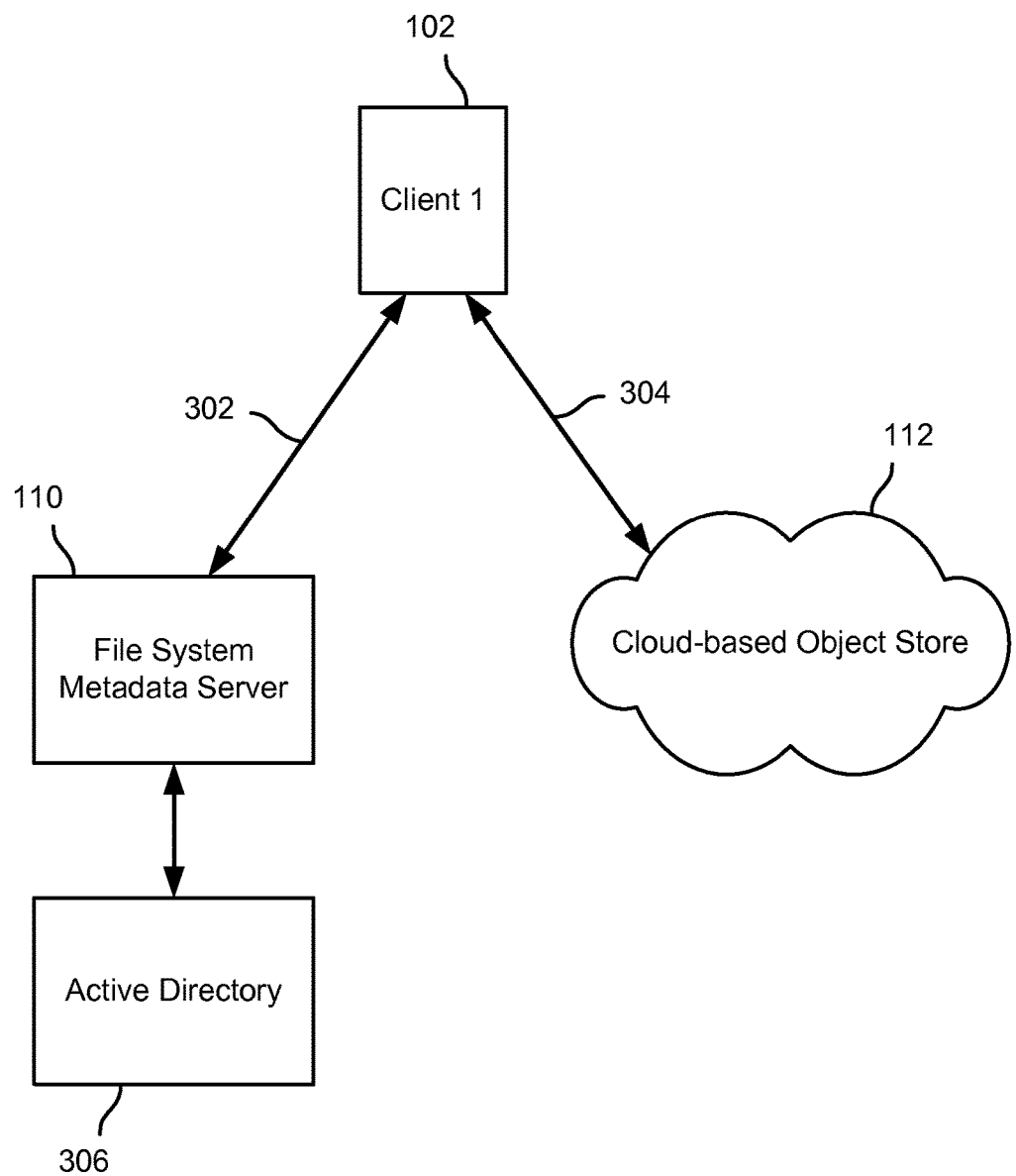
FIG. 3 is a block diagram illustrating an embodiment of a distributed file system.

FIG. 3 is a block diagram illustrating an embodiment of a distributed file system. In the example shown, client 102 communicates via a secure session-based connection 302 with file system metadata server 110. In addition, client 102 communicates with cloud-based object store 112 via a TCP/IP or other connection that enables client 102 to store objects (e.g., file segments or "chunks") via HTTP "PUT" requests and to retrieve segments ("chunks") via HTTP "GET" requests. In various embodiments, client 102 (e.g., a file system client or other agent running on client 102) sends and receives distributed file system "control plane" communications via secure connection 302 (e.g., file system operations that change or require the processing and/or use of file system metadata), whereas communicates sent via connection 304 may be considered to comprising a "data plane" via which file system object data (i.e., segments or "chunks") may be stored and/or retrieved. In the example shown, file system metadata server 110 has access to active directory 306, which in various embodiments may comprise information usable to authenticate users of clients such as client 102.

In various embodiments, file system objects, such as files, may be stored by a client on which a distribute file system client or other agent has been installed. Upon receiving a request to store (or modify) a file system object, in various embodiments the file system client segments the object into one or more segments or "chunks" and computes a reference (e.g., a hash) for each. The references are included in a file system request sent to the file system metadata server, e.g., via a secure connection such as connection 302 of FIG. 3. The file system metadata server returns information to be used by the file system client to store (non-duplicate) segments/chunks in the cloud-based object store by sending the segment data directly to the cloud-based object store, e.g., via PUT requests sent via a connection such as connection 304 of FIG. 3.

Figure 4:
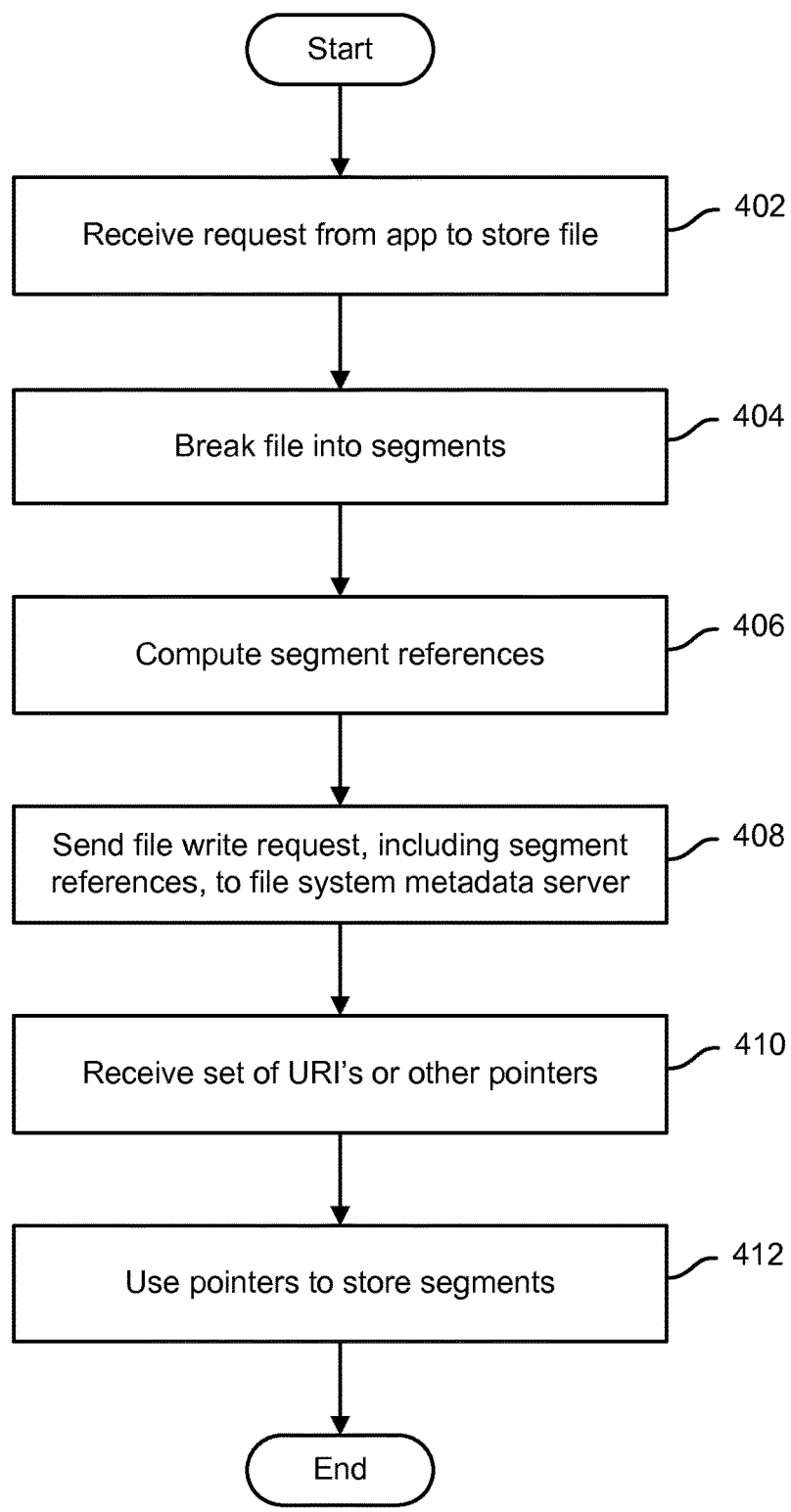
FIG. 4 is a flow chart illustrating an embodiment of a process to store a file or other file system object in a distributed file system.

FIG. 4 is a flow chart illustrating an embodiment of a process to store a file or other file system object in a distributed file system. In various embodiments, the process of FIG. 4 may be performed on a client system or device, e.g., by a file system client or other agent running on the client system/device, such as file system client 208 of FIG. 2. In the example shown, a request is received, e.g., from an application, to store a file (402). The file is segmented into one or more segments (404). For each segment, a segment reference, e.g., a hash, is computed (406). A file write request that includes the segment references is sent to the file system metadata server (408). A set of uniform resource indicators (URI's) or other pointers is received from the file system metadata server (410). In various embodiments, the set of pointers may include pointers only for those segments not already stored by the distributed file system. The received pointers are used to store segments, e.g., via HTTP "PUT" requests sent directly to the cloud-based object store (412).

Figure 5:
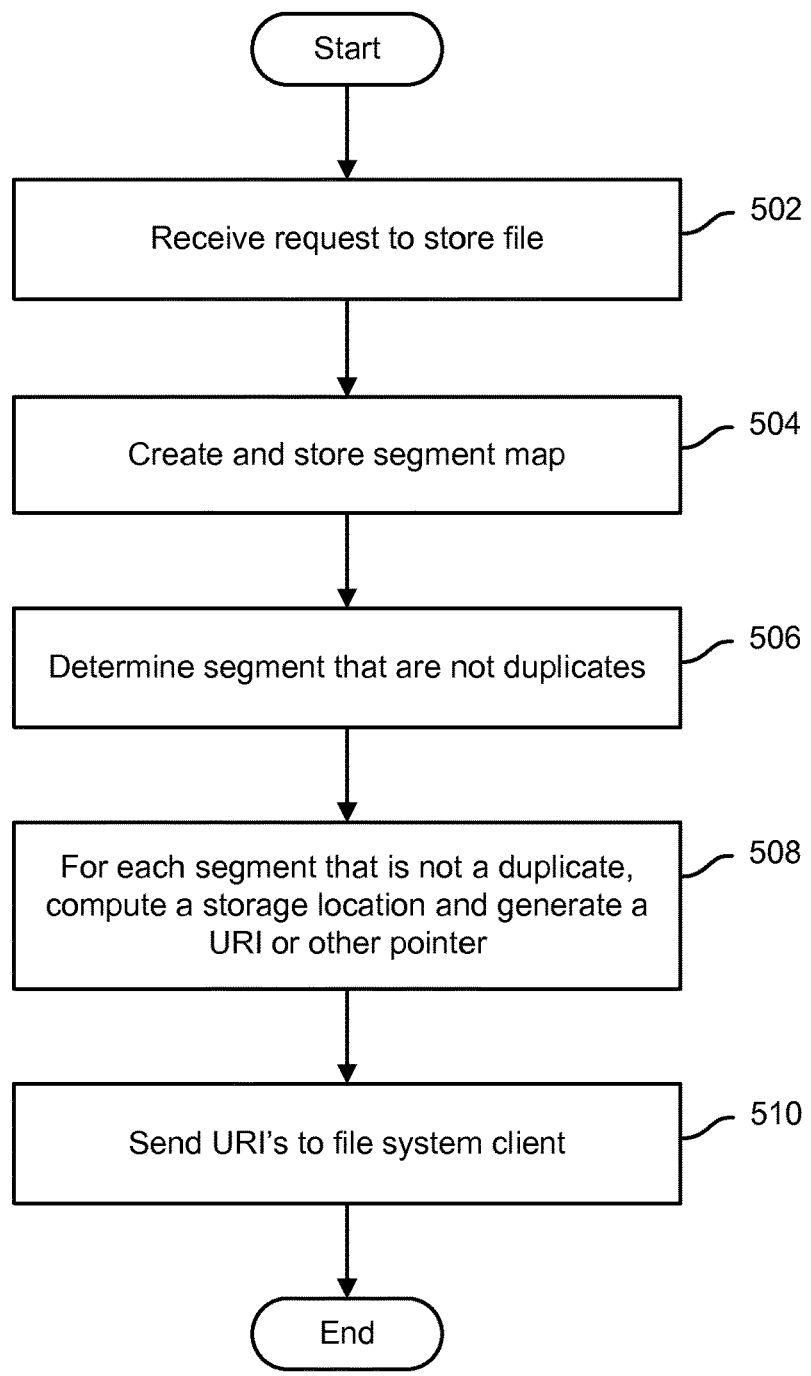
FIG. 5 is a flow chart illustrating an embodiment of a process to handle a request to store a file or other file system object in a distributed file system.

FIG. 5 is a flow chart illustrating an embodiment of a process to handle a request to store a file or other file system object in a distributed file system. In various embodiments, the process of FIG. 5 may be performed by a file system metadata server, such as file system metadata server 110 of FIG. 1. In the example shown, a request to store a file is received (502). A segment ("chunk") map that associates the file system object name and/or other identifier (e.g., file name, pathname) with a set of one or more segment references (e.g., hash values) is created (504). Segments that are not duplicates of segments already stored by the distributed file system are identified, for example based on the segment references (506). For each segment that is not a duplicate, a storage location is computed (e.g., based at least in part on all or part of the segment reference) and a URI or other pointer usable to store the segment directly in the cloud-based data store is generated (508). In various embodiments, the URI or other pointer is signed cryptographically by the file system metadata server. The URI may have an expiration time by which it must be used to store the segment. The URI's are sent to the file system client from which the request to store the file was received (510).

Figure 6:
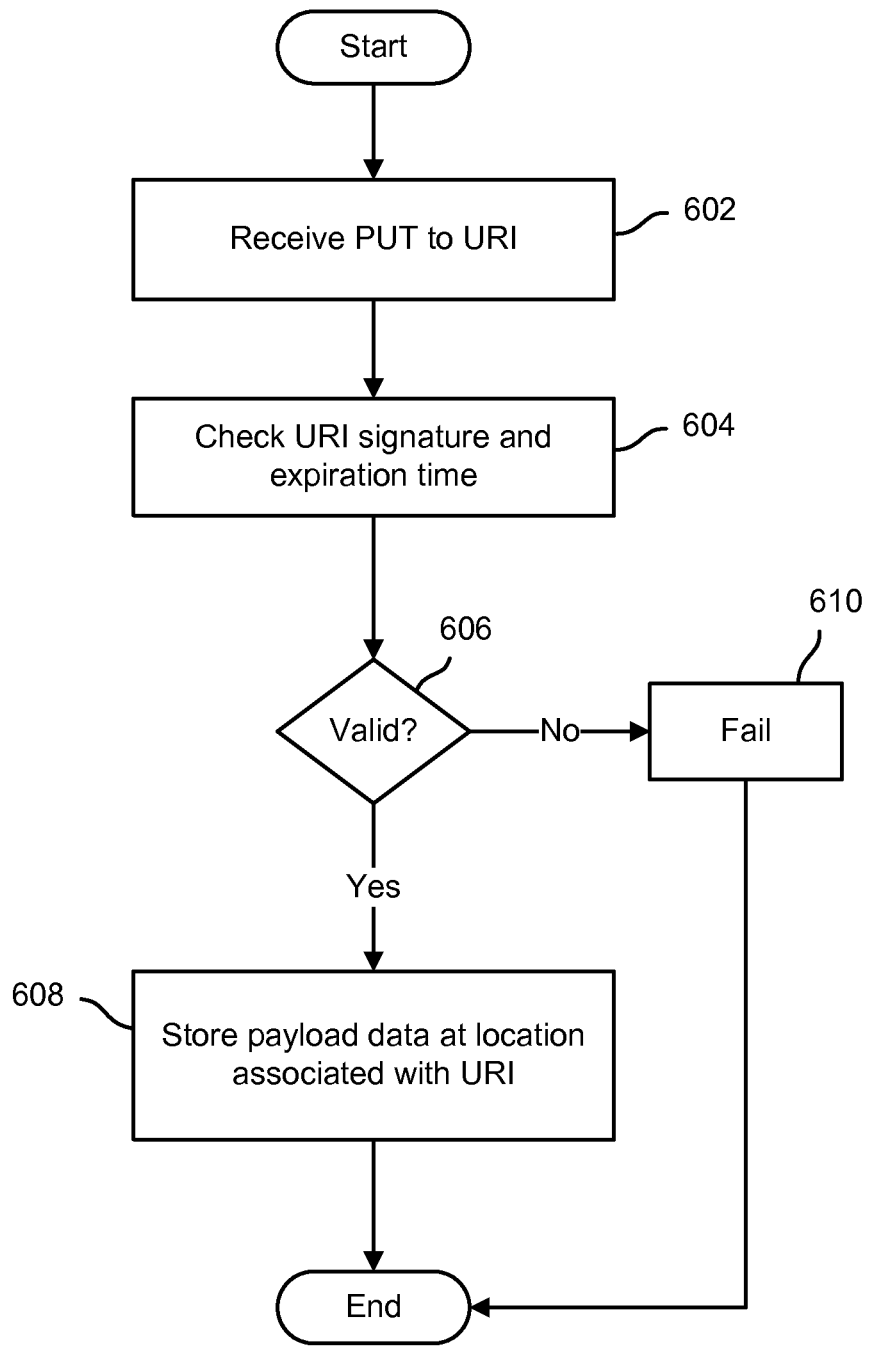
FIG. 6 is a flow chart illustrating an embodiment of a process to store file segment or "chunk" data associated with a distributed file system.

FIG. 6 is a flow chart illustrating an embodiment of a process to store file segment or "chunk" data associated with a distributed file system. In various embodiments, the process of FIG. 6 may be performed by a cloud-based object store, such as object store 112 of FIG. 1. In the example shown, a "PUT" request associated with a URI specified in the request is received (602). A cryptographic signature associated with the URI and an expiration time encoded in the URI are checked (604). For example, the cloud-based object store may be provisioned to check that the URI has been signed by a trusted file system metadata server and/or that an expiration time of the URI has not elapsed. If the URI is determined to be currently valid (606), a payload data associated with the PUT request, e.g., file system object segment or "chunk" data, is stored in a location associated with the URI (608). If the URI is determined to not be valid (606), the PUT request fails (610), and the file system client receives a response indicating it must obtain a new URI from the file system metadata server.

In various embodiments, file system objects, such as files, may be retrieved by a client on which a distribute file system client or other agent has been installed. Upon receiving a request to access a file system object, in various embodiments the file system client sends a file access request to the file system metadata server, e.g., via a secure connection such as connection 302 of FIG. 3. The file system metadata server returns information (e.g., one or more URI's or other pointers) to be used by the file system client to retrieve segments/chunks directly from the cloud-based object store, e.g., via GET requests sent via a connection such as connection 304 of FIG. 3.

Figure 7:
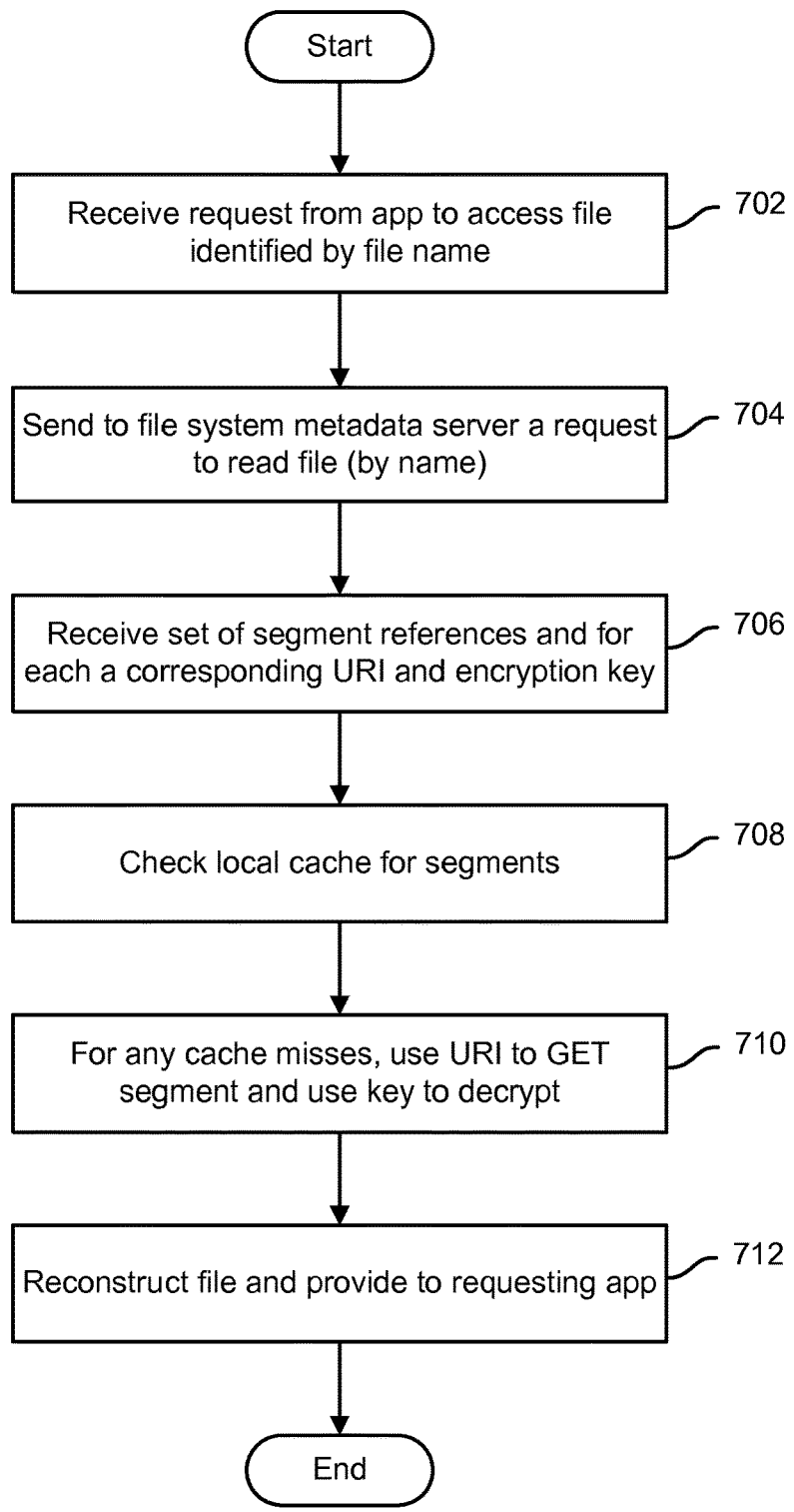
FIG. 7 is a flow chart illustrating an embodiment of a process to access a file or other file system object stored in a distributed file system.

FIG. 7 is a flow chart illustrating an embodiment of a process to access a file or other file system object stored in a distributed file system. In various embodiments, the process of FIG. 4 may be performed on a client system or device, e.g., by a file system client or other agent running on the client system/device, such as file system client 208 of FIG. 2. In the example shown, a request to access a file system object, e.g. a file identified by file name, is received from an application (702). A request is sent to a file system metadata server to retrieve the file (704). A set of segment references, and for each a corresponding URI and encryption key, is received from the file system metadata server (706). A local cache is checked to determine whether any required segments are present in the cache (708). For all segments not present in the cache, the associated URI is used to send a GET request to retrieve the segment from the cloud-based object store, and the associated key is used to decrypt the segment once it has been received from the object store in encrypted form (710). The segments are used to reconstruct the file and provide access to the file to the application from which the access request was received (712).

Figure 8:
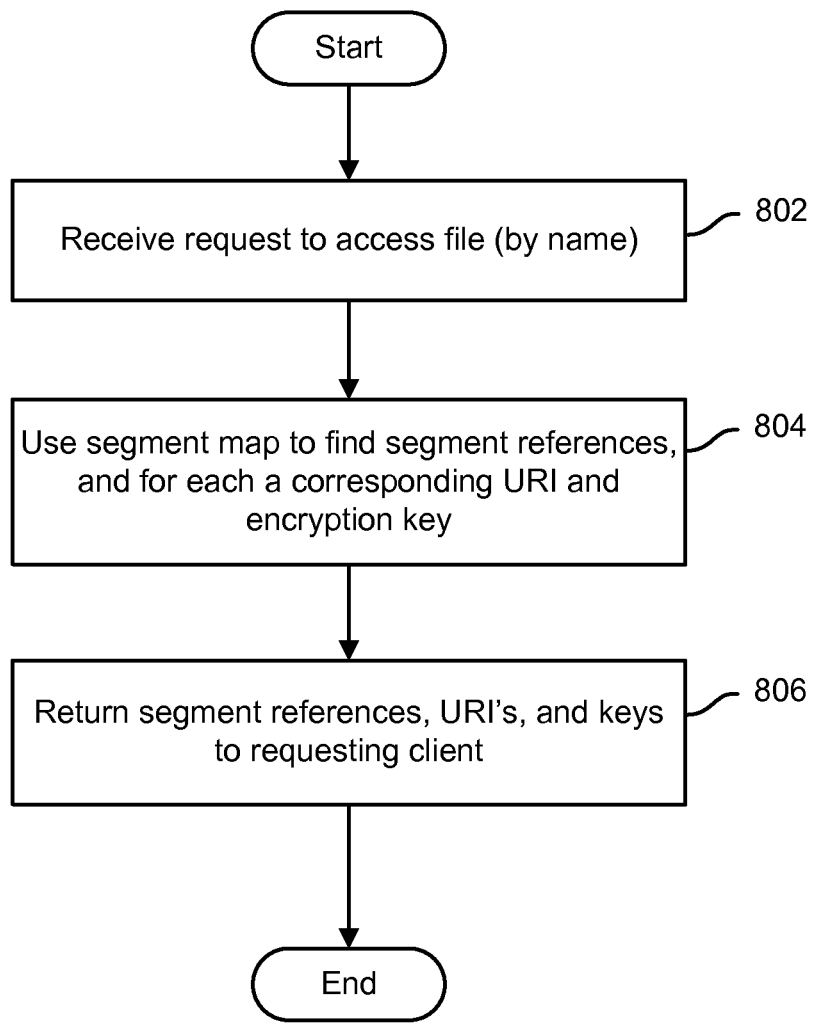
FIG. 8 is a flow chart illustrating an embodiment of a process to handle a request to access a file or other file system object stored in a distributed file system.

FIG. 8 is a flow chart illustrating an embodiment of a process to handle a request to access a file or other file system object stored in a distributed file system. In various embodiments, the process of FIG. 5 may be performed by a file system metadata server, such as file system metadata server 110 of FIG. 1. In the example shown, a request to access a named file is received (802). A segment map associated with the file is retrieved and used to determine a set of segment references (e.g., hashes), and for each a corresponding URI indicating where the segment is stored in the cloud-based segment store and an encryption key usable to decrypt the segment (804). The segment references, URI's, and keys are returned to the file system client from which the file access request was received (806).

Epoch-based management of distribute file system file data associated with currently-stored snapshots is disclosed.

Figure 9:
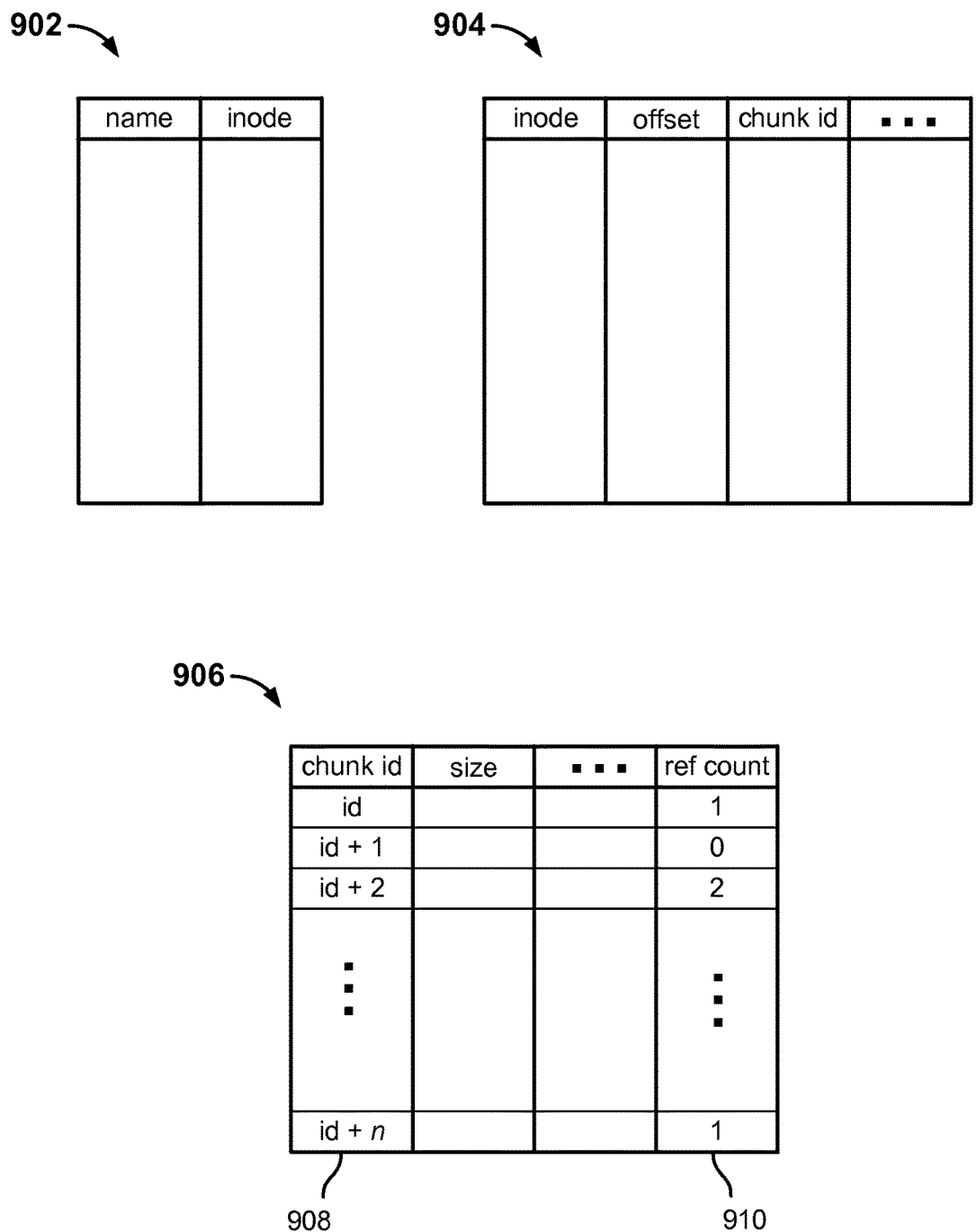
FIG. 9 is a block diagram illustrating an example set of file system metadata tables used in an embodiment of a distributed file system.

FIG. 9 is a block diagram illustrating an example set of file system metadata tables used in an embodiment of a distributed file system. In various embodiments, the tables 902, 904, and 906 of FIG. 9 may be created and maintained by a file system metadata server, such as file system metadata server 110 of FIGS. 1 and 3. In the example shown, an inode table 902 is used to store data associating each named file system object, e.g., directories, files, or other objects, with a corresponding inode or other unique number or identifier. Chunk map table 904 is used in various embodiments to store for each file, and for each of one or more segments (chunks) into which that file has been broken up to be stored, an offset of the chunk within the file, a chunk identifier (chunk id), and other metadata. For example, a file that has been stored as three chunks would have three entries (rows) in table 904, one for each chunk. In various embodiments, the chunk id is a monotonically increasing value, with each successively stored chunk being given a next chunk id in alphanumeric order. In various embodiments, chunks are immutable once stored. If file data is modified, affected data is stored as a new chunk and assigned a next chunk id in order. As a result, a chunk with a higher chunk id by definition was stored subsequent to a chunk with a lower chunk id, and it can be assumed neither was modified since it was created and stored.

Finally, the chunk metadata table 906 includes a row for each chunk, identified by chunk id (column 908 in the example shown), and for each chunk metadata indicating the size of the chunk, other metadata, and a reference count (column 910 in the example shown) indicating how many currently live files (or other file system objects) reference the chunk. For example, if a file is created by copying another file, each of them would reference the chunks comprising the file that was copied. The copy operation would result in the reference count for each such segment being incremented by adding "1" in this example. However, any monotonically increasing function may be used.

In some embodiments, the tables shown in FIG. 9 relate to a database backed file system. In some embodiments, other and/or more abstract (non-database) data structures may be referenced. In some embodiments, the chunk map may include a mapping between (inode_id, offset) on the one hand and "chunk id" on the other.

Figure 10:
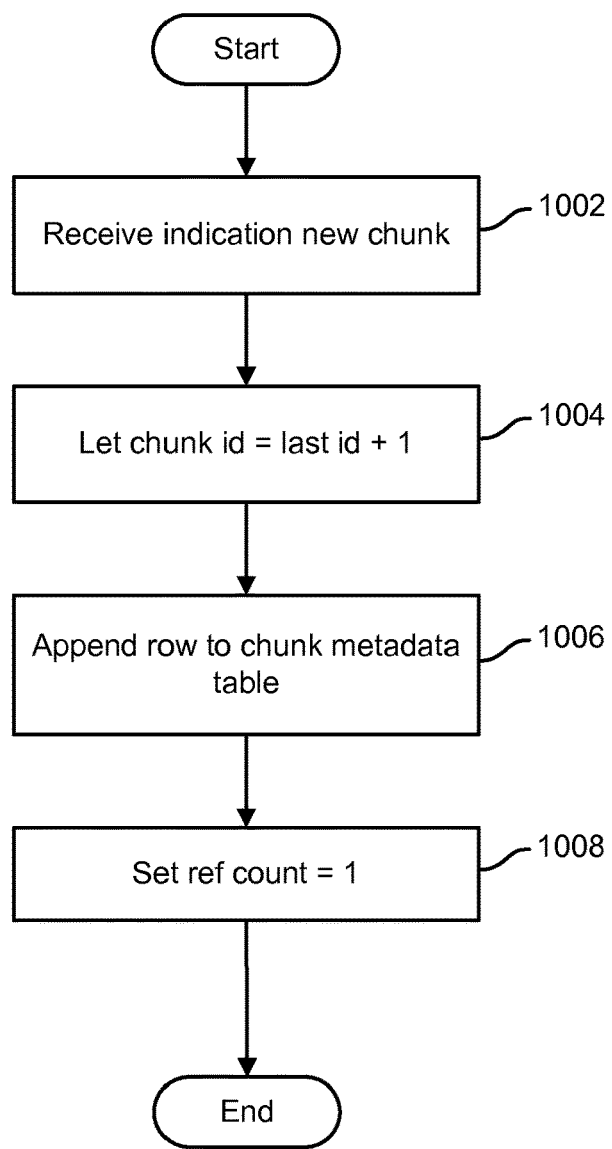
FIG. 10 is a flow chart illustrating an embodiment of a process to generate and store a new file segment (chunk) in a distributed file system.

FIG. 10 is a flow chart illustrating an embodiment of a process to generate and store a new file segment (chunk) in a distributed file system. In various embodiments, the process of FIG. 10 may be implemented by a file system metadata server, such as file system metadata server 110 of FIG. 1. In various embodiments, all or part of the process of FIG. 10 may be performed with respect to a chunk metadata table, such as chunk metadata table 906 of FIG. 9. In the example shown, an indication to store a new chunk is received (1002). For example, the file system metadata server may receive a request from a file system client to store a new file and/or an update to an existing file and may have included in the request data identifying one or more chunks that are new to the file system, e.g., as determined based on their corresponding segment references. A chunk id that is next in a monotonically increasing set of chunk id's, in this case one more than the last assigned chunk id, is computed for the new chunk (1004). A corresponding row is appended to the chunk metadata table (1006), such as chunk metadata table 906 of FIG. 9. In the row added to the chunk metadata table for the new chunk, the reference count is set initially to "1", to reflect that the file in connection with which the new chunk is being stored references the chunk (1008).

In various embodiments, the fact that chunk id values increase monotonically as new chunks are stored, and that chunks are immutable once stored, enable chunk id values to be used as disclosed herein to determine whether a given chunk, such as one that may otherwise be subject to deletion, is or is not associated with a particular snapshot. In various embodiments, the determination may be made based at least in part on one or both of stored data indicating for each snapshot a last chunk id assigned as of a time the snapshot was created and stored data indicating when chunks were determined to be no longer referenced by any active file system object relative to "epochs" or other periods associated with successive snapshot creation events.

Figure 11:
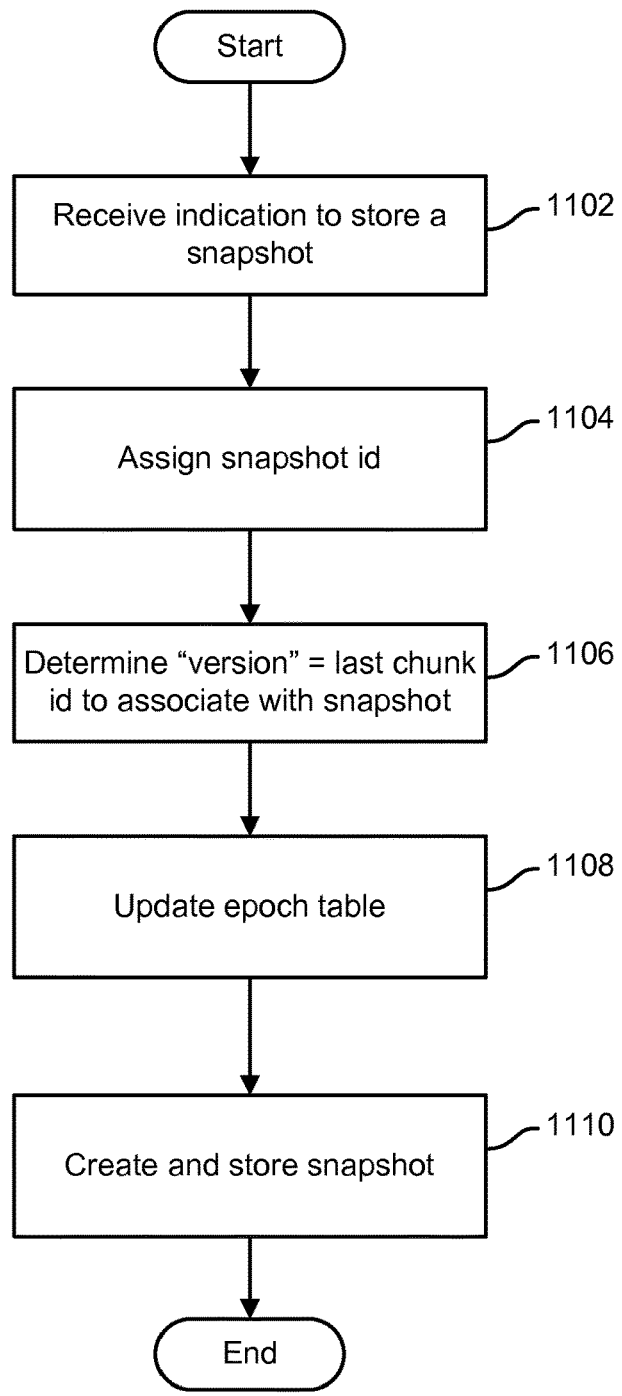
FIG. 11 is a flow chart illustrating an embodiment of a process to create a snapshot of distributed file system data.

FIG. 11 is a flow chart illustrating an embodiment of a process to create a snapshot of distributed file system data. In the example shown, an indication to create a snapshot is received (1102). For example, a time to take a scheduled snapshot may have arrived. A snapshot id is assigned to identify the snapshot (1104). A "version" or last chunk id assigned as of the time the snapshot is to be created is determined (1106). An "epoch" table or other data structure is updated to associate the determined last chunk id with the snapshot (1108). A snapshot of file system data and/or metadata is created and stored (1110).

FIG. 12 is a block diagram illustrating an example of data structures used to keep track of the relationship between file segments (chunks) and snapshots in an embodiment of a distributed file system. In the example shown, an epoch table 1202 includes a first (left) column in which epoch identifiers are listed, e.g., snapshot id or other identifier associated with a snapshot, and a second (right) column in which for each epoch (snapshot) a "last chunk id" assigned as of a time an associated snapshot was created is stored. FIG. 12 also illustrates an example of a "death" table 1240. In various embodiments, a "death" table such as table 1240 or another data structure is used to store for each of at least a subset of chunks that have been determined to no longer be referenced by any live file system object a corresponding "epoch" in which the "death" determination was made. In various embodiments, an epoch may be a period of time between successive snapshots. In some embodiments, an epoch may be identified by a snapshot identifier associated with a snapshot that comprises and/or is otherwise associated with the epoch, such as a snapshot that defines or is otherwise associated with a beginning or ending boundary of the epoch. In the example shown in FIG. 12, database tables are used to implement the mappings shown in FIG. 12 and described above. In some embodiments, data structures other than database tables may be used.

Figure 13:
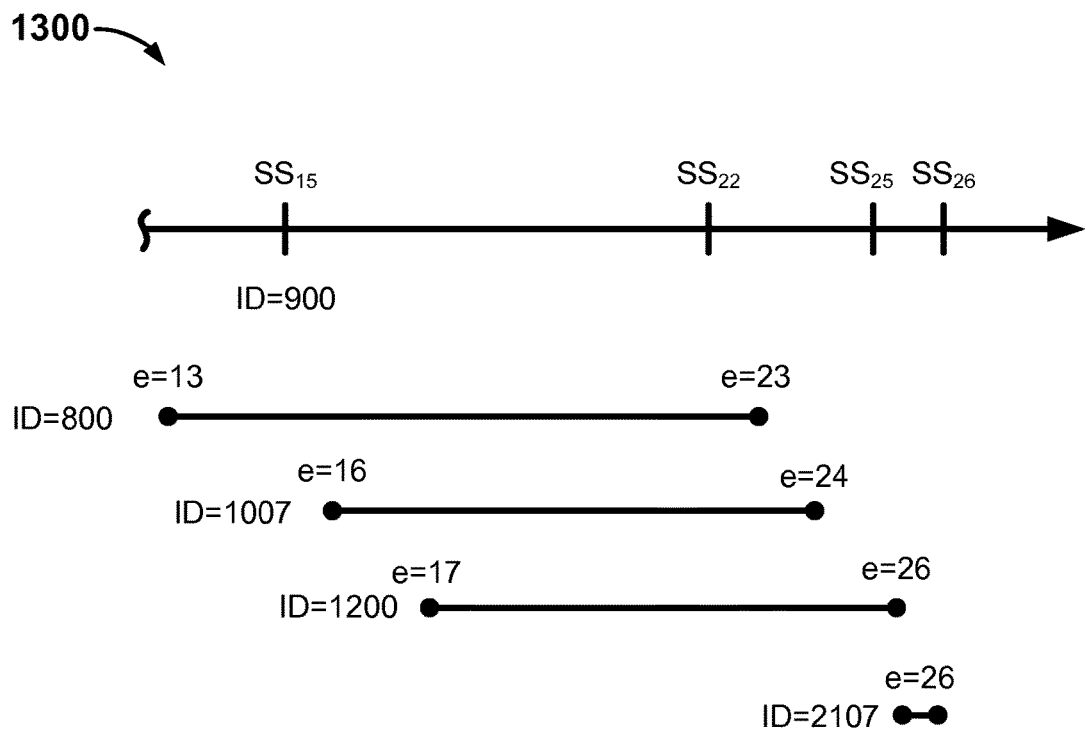
FIG. 13 is a block diagram illustrating an example of temporal relationships between file segments (chunks) and snapshots in an embodiment of a distributed file system.

FIG. 13 is a block diagram illustrating an example of temporal relationships between file segments (chunks) and snapshots in an embodiment of a distributed file system. In the example shown, a timeline 1300 indicates the relative temporal relationship between the snapshots shown, indicated in this example by the snapshot identifiers $SS_{15}$, $SS_{22}$, $SS_{25}$, and $SS_{26}$. In this example, the snapshots shown in FIG. 13 have corresponding entries in the example "epoch" table 1202 of FIG. 12. For example, the snapshot $SS_{15}$ corresponds to the entry for "epoch" 15 in table 1202 of FIG. 12. The annotation "ID=900" below the snapshot identifier $SS_{15}$ in FIG. 13 corresponds to the entry in table 1202 of FIG. 12, indicating that the last chunk id assigned as of the time the snapshot corresponding to epoch "15" was taken was "900". Referring further to table 1202 in FIG. 12, the last chunk id's associated with the snapshots $SS_{22}$, $SS_{25}$, and $SS_{26}$, are ID=1740, 2000, and 2200, respectively.

FIG. 13 also includes a representation of the lifespan of four chunks, having ID=800, 1007, 1200, and 2107, respectively. In this example, each is shown to have been "born" in the epoch indicated at the left end of the lifespan/timeline shown for each respective chunk and has having been determined to no longer be referenced by any live file system object as of the epoch indicated at right in FIG. 13, which corresponds to the information listed for each object in the example "death" table 1240 of FIG. 12. In this example, the chunk having ID=800 is shown as having been "born" prior to the creation of snapshot "$SS_{15}$" (also known because chunk id's up to ID=900 had been assigned as of the time snapshot $SS_{15}$ was created), and having "died" in epoch=23 (in this example presumably corresponding to a snapshot $SS_{23}$ that is no longer being stored). Similarly, the chunk having ID=1007 is shown as having been "born" after snapshot $SS_{15}$ having been created (also determinable from the fact that ID=1007 is greater than the last and therefore highest sequentially chunk ID=900 that had been assigned as of the time $SS_{15}$ was created, as reflected in epoch table 1202 of FIG. 12) and having died in epoch=24 (i.e., prior to the snapshots $SS_{24}$ and $SS_{25}$ having been created, in this example). The chunk having ID=1200 is shown to have been born subsequent to the creation of snapshot $SS_{15}$ and to have died in epoch 26, i.e., subsequent to the creation of snapshot $SS_{25}$ and prior to the creation of snapshot $SS_{26}$. As a result, chunk ID=1200 would have been live at the time snapshot $SS_{25}$ was created but not by the time snapshot $SS_{26}$ was created. Finally, in this example the chunk having ID=2107 was born after snapshot $SS_{25}$ was created (ID=2107>last chunk id associated with epoch 25 in epoch table 1202 of FIG. 12) and died before snapshot $SS_{26}$ was created. As a result, the chunk ID=2107 was not alive when any snapshot was taken, in this example.

In various embodiments, the temporal relationships between snapshots/epochs on the one hand and chunk creation ("birth") and "death" on the other are tracked and/or determined based on data stored in structures such as the epoch table 1202 and the death table 1204 of FIG. 12, as disclosed herein. These temporal relationships are used, in various embodiments, to determine whether chunks that are no longer referenced by any live file system object, such as a file, may be deleted, or if instead they should be retained due to being associated with a snapshot that is still being stored.

Figure 14:
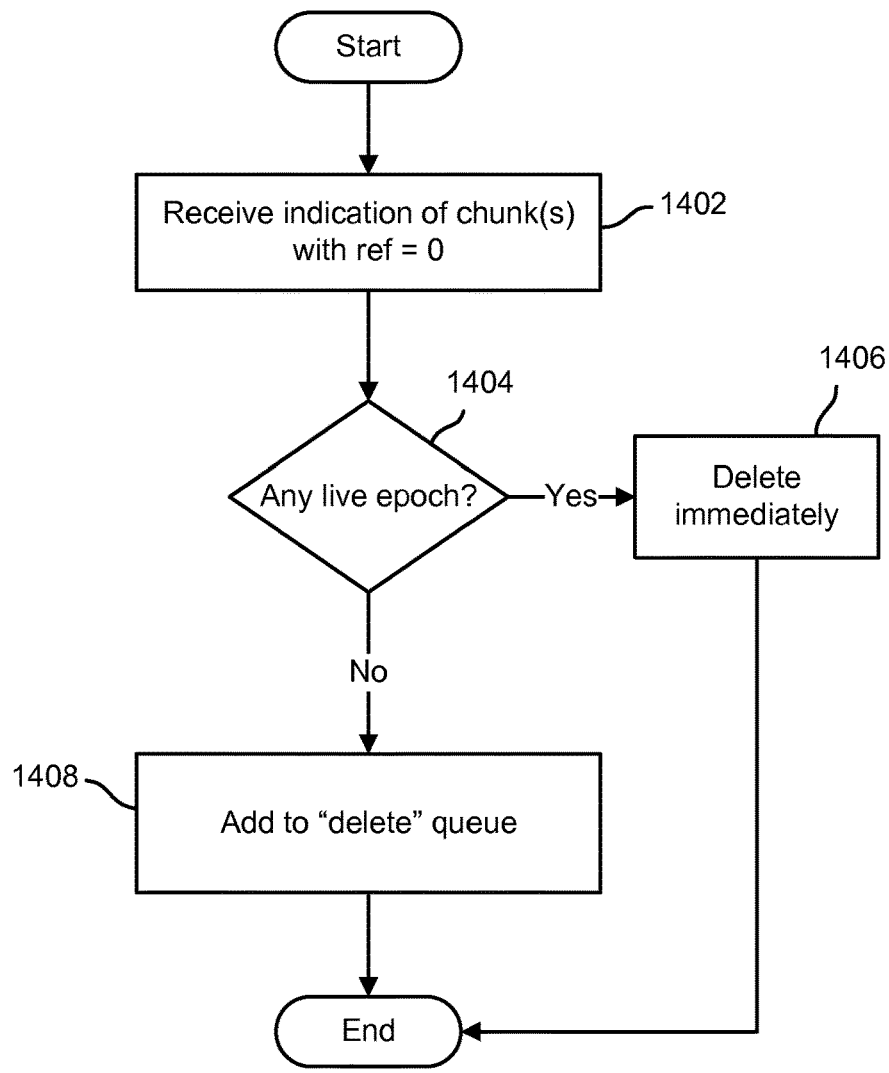
FIG. 14 is a flow chart illustrating an embodiment of a process to provide for possible deletion of file segments (chunks) that are no longer referenced.

FIG. 14 is a flow chart illustrating an embodiment of a process to provide for possible deletion of file segments (chunks) that are no longer referenced. In various embodiments, the process of FIG. 14 may be implemented by a file system metadata server, such as file system metadata server 110 of FIG. 1. In the example shown, an indication is received that a chunk has a reference count equal to zero, i.e., no active file system object references the chunk (1402). In various embodiments, the indication may be received at a time a last file referencing the chunk is deleted; by performing a query or other search at a time a next snapshot is taken; by performing a query or other search at a time a snapshot is deleted; etc. It is determined whether there are any "live" (i.e., snapshot taken and still exists) epochs since the chunk's birth. If no "live" epoch (snapshot) since the chunk's birth exists (1404), the chunk is deleted immediately (1406). For example, if the chunk ID is greater than a last chunk ID stored in an epoch table, such as table 1202 of FIG. 12, for the most recent snapshot, and no subsequent snapshot has been created, then the chunk is not in any snapshot and can be deleted immediately (1404, 1406). If instead the chunk is determined to have "died" in a different epoch than the one in which it was created (1404), such that the chunk is/was in at least one snapshot, the chunk is added to a "delete" task queue (1408), and is processed in various embodiments as described more fully below.

Figure 15:
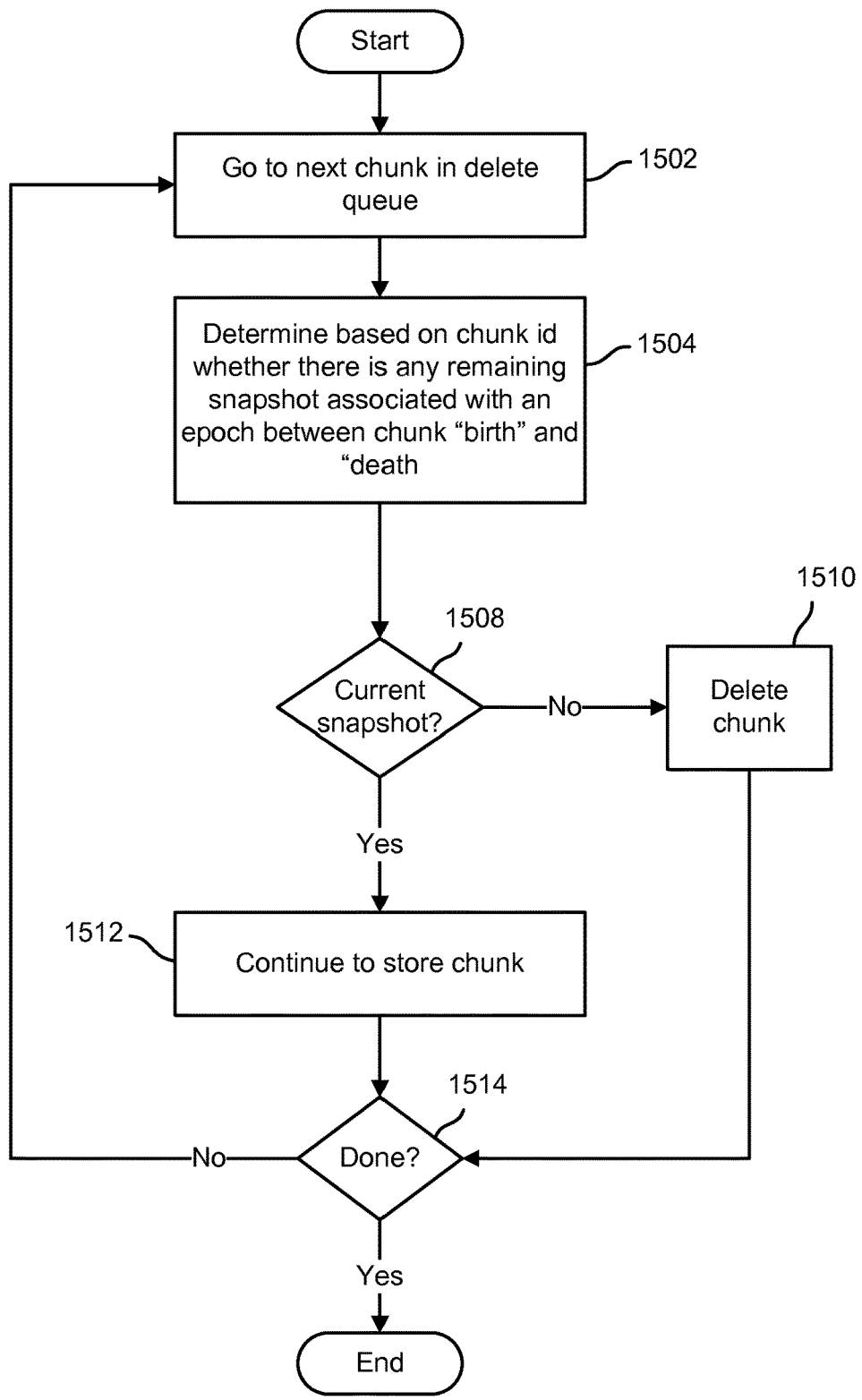
FIG. 15 is a flow chart illustrating an embodiment of a process to determine whether to continue to store or instead delete a chunk that may no longer be associated with any remaining snapshot.

FIG. 15 is a flow chart illustrating an embodiment of a process to determine whether to continue to store or instead delete a chunk that may no longer be associated with any remaining snapshot. In various embodiments, the process of FIG. 15 may be implemented by a file system metadata server, such as file system metadata server 110 of FIG. 1. In various embodiments, the process of FIG. 15 is performed with respect to chunks that have been placed in a delete queue, such as the one mentioned above in connection with step 1408 of FIG. 14. In the example shown in FIG. 15, a next chunk delete task is pulled from the chunk delete queue (1502). It is determined, based at least in part on chunk id, whether there is any remaining snapshot (i.e., one that was created and is still being retained, e.g., per policy) that was created after the chunk's birth but before the chunk's death (1504). In some embodiments, the determination is made by using the chunk id, the epoch table, and in some embodiments a list or other set of data indication by snapshot id which snapshots remain subject to retention, to determine whether any snapshot that is still being retained was created subsequent to the chunk's birth and prior to the epoch in which the chunk was determined to have died, as indicated in the death table. If no such snapshot exists (1508), the chunk is deleted (1510). In some embodiments, the process of deletion is asynchronous, and step 1510 includes being place in a queue to be deleted. If at least one such snapshot is found (1508), the chunk continues to be stored (1512). The process continues through subsequent iterations so long as there are further chunk deletion tasks in the delete queue (1514).

Figure 16:
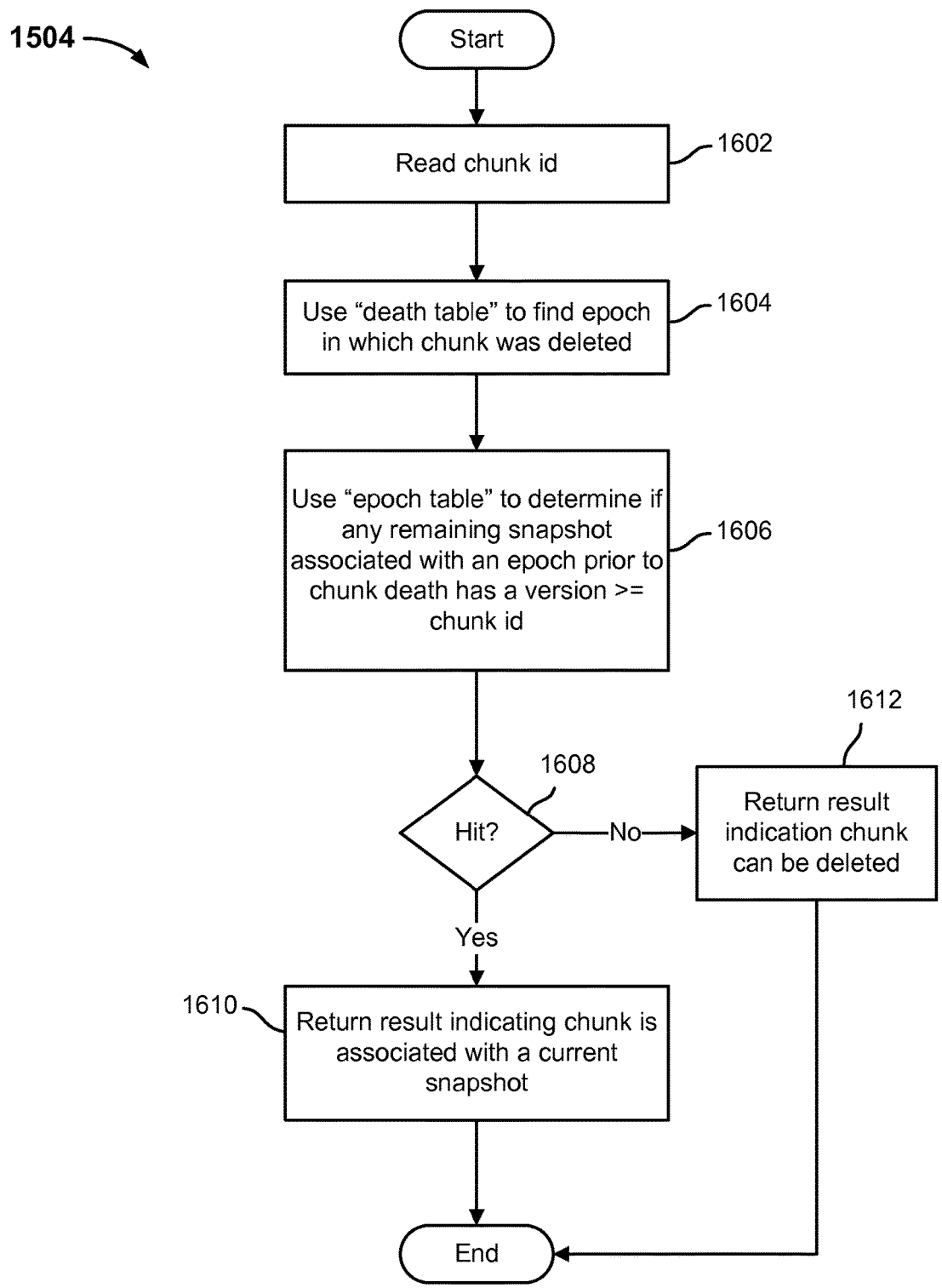
FIG. 16 is a flow chart illustrating an embodiment of a process to determine whether a given chunk can be deleted.

FIG. 16 is a flow chart illustrating an embodiment of a process to determine whether a given chunk can be deleted. In various embodiments, the process of FIG. 16 may be used to perform step 1504 of the process of FIG. 15. In the example shown, the chunk id is read (1602). A "death" table or other data structure is read to find the epoch in which the chunk was determined to be no longer referenced by any live file system object (i.e., reference count=0) (1604). In various embodiments, the epoch may be identified directly by and/or be mapped using another data structure to a corresponding snapshot id or other snapshot identifier. An "epoch" table or other data structure is used to determine if any remaining snapshot created subsequent to the chunk being "born", i.e., snapshot/epoch has a "version" (last assigned chunk id) that is greater than the chunk id of the chunk being processed, is associated with an epoch prior to the epoch in which the chunk died (1606). If no such snapshot is found (1608), a result indicating the chunk can be deleted is returned (1612). If such a snapshot is found (1608), a result is returned indicating the chunk is associated with a current snapshot and cannot be deleted (1610).

Techniques disclosed herein are used in various embodiments to determine whether and/or when file segments (chunks) that are no longer referenced by any live file system object can be deleted, without storing large indexes or other repositories of information as to which file segments (chunks) were reference by one or more files in the file system at the time each snapshot was created.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method managing file system data, comprising:
for each of a plurality of snapshots, storing, by one or more processors, in a first data structure data that associates with the snapshot a corresponding last chunk identifier assigned as of a time at which the snapshot is or was created;

storing, by one or more processors, in a second data structure, for each of a plurality of chunks of file system data no longer referenced by a file system object that has not been subject to deletion, an epoch identifier associated with an epoch in which the chunk became no longer referenced by a file system object that has not been subject to deletion, wherein each epoch is associated with one or more snapshots, the one or more snapshots are associated with respective snapshot creation times which define one or both of a beginning and an end of the epoch;

comparing, by one or more processors, a chunk identifier and associated epoch comprising an entry in the second data structure with one or more entries in the first data structure to determine whether a chunk associated with the chunk identifier is associated with a snapshot that continues to be retained, wherein a chunk is determined not to be included in a snapshot by virtue of the chunk having been created and stored subsequent to the snapshot having been created, and wherein said determination is made at least in part by comparing a chunk identifier of the chunk with a last chunk identifier associated with the snapshot in the first data structure and concluding that the chunk identifier is greater than the last chunk identifier associated with the snapshot;

determining, by one or more processors, a status with respect to deletion of the chunk corresponding to the chunk identifiers, wherein the status with respect to deletion of the chunk is based at least in part on the comparison of the chunk identifier and associated epoch comprising the entry in the second data structure with one or more entries in the first data structure; and deleting the chunk based at least in part on a determination made based on least in part on the comparison that the chunk associated with the chunk identifier is not associated with any snapshot that continues to be retained.

2. The method of claim 1, further comprising assigning to chunks of file system data, as each chunk is created and stored in the file system, a corresponding chunk identifier.

3. The method of claim 2, wherein the chunk identifiers are monotonically increasing over time.

4. The method of claim 3, wherein a birth epoch of a chunk is determined based on chunk identifier.

5. The method of claim 1, wherein chunks as stored in the file system are immutable.

6. The method of claim 1, further comprising receiving an indication that a chunk is no longer referenced by a file system object that has not been subject to deletion.

7. The method of claim 6, further comprising adding to a delete queue data associated with the chunk.

8. The method of claim 6, further comprising deleting the chunk immediately based at least in part on a determination that the chunk was created and became no longer referenced within a same epoch.

9. The method of claim 1, wherein an epoch is defined with reference to a snapshot that marks either the beginning or the end of the epoch.

10. The method of claim 9, wherein the snapshot marks the end of the epoch and the epoch extends to a next previous snapshot to the snapshot that marks the end of the epoch.

11. The method of claim 1, wherein a chunk is further determined not to be included in a snapshot by virtue of the chunk having become no longer referenced by a file system object that has not been subject to deletion at a time prior a creation time when the snapshot was created, and wherein said determination is made at least in part by comparing an epoch associated with the chunk identifier in a corresponding entry in the second data structure to an epoch or other identifier associated with the snapshot and concluding that the epoch in which the chunk became no longer referenced is prior to or the same as an epoch immediately preceding creation of the snapshot.

12. A computer system, comprising:

a storage device; and one or more processors coupled to the storage device and configured to:

store in a first data structure on the storage device, for each of a plurality of snapshots, data that associates with the snapshot a corresponding last chunk identifier assigned as of a time at which the snapshot is or was created;

store in a second data structure on the storage device, for each of a plurality of chunks of file system data no longer referenced by a file system object that has not been subject to deletion, an epoch identifier associated with an epoch in which the chunk became no longer referenced by a file system object that has not been subject to deletion, wherein each epoch is associated with one or more snapshots, the one or more snapshots are associated with respective snapshot creation times which define one or both of a beginning and an end of the epoch;

compare a chunk identifier and associated epoch comprising an entry in the second data structure with one or more entries in the first data structure to determine whether a chunk associated with the chunk identifier is associated with a snapshot that continues to be retained, wherein a chunk is determined not to be included in a snapshot by virtue of the chunk having been created and stored subsequent to the snapshot having been created, and wherein said determination is made at least in part by comparing a chunk identifier of the chunk with a last chunk identifier associated with the snapshot in the first data structure and concluding that the chunk identifier is greater than the last chunk identifier associated with the snapshot;

determine a status with respect to deletion of the chunk corresponding to the chunk identifiers, wherein the status with respect to deletion of the chunk is based at least in part on the comparison of the chunk identifier and associated epoch comprising the entry in the second data structure with one or more entries in the first data structure; and delete the chunk based at least in part on a determination made based on least in part on the comparison that the chunk associated with the chunk identifier is not associated with any snapshot that continues to be retained.

13. The system of claim 12, wherein the processor is further configured to assign to chunks of file system data, as each chunk is created and stored in the file system, a corresponding chunk identifier.

14. The system of claim 13, wherein the chunk identifiers are monotonically increasing over time.

15. The system of claim 14, wherein a birth epoch of a chunk is determined based on chunk identifier.

16. The system of claim 12, wherein an epoch is defined with reference to a snapshot that marks either the beginning or the end of the epoch.

17. A computer program product to manage file system data, the computer program product being embodied in a non-transitory computer readable storage medium and comprising computer instructions for:

for each of a plurality of snapshots, storing in a first data structure data that associates with the snapshot a corresponding last chunk identifier assigned as of a time at which the snapshot is or was created;

storing in a second data structure, for each of a plurality of chunks of file system data no longer referenced by a file system object that has not been subject to deletion, an epoch identifier associated with an epoch in which the chunk became no longer referenced by a file system object that has not been subject to deletion, wherein each epoch is associated with one or more snapshots, the one or more snapshots are associated with respective snapshot creation times of which define one or both of a beginning and an end of the epoch;

comparing a chunk identifier and associated epoch comprising an entry in the second data structure with one or more entries in the first data structure to determine whether a chunk associated with the chunk identifier is associated with a snapshot that continues to be retained, wherein a chunk is determined not to be included in a snapshot by virtue of the chunk having been created and stored subsequent to the snapshot having been created, and wherein said determination is made at least in part by comparing a chunk identifier of the chunk with a last chunk identifier associated with the snapshot in the first data structure and concluding that the chunk identifier is greater than the last chunk identifier associated with the snapshot;

determining a status with respect to deletion of the chunk corresponding to the chunk identifiers, wherein the status with respect to deletion of the chunk is based at least in part on the comparison of the chunk identifier and associated epoch comprising the entry in the second data structure with one or more entries in the first data structure; and deleting the chunk based at least in part on a determination made based on least in part on the comparison that the chunk associated with the chunk identifier is not associated with any snapshot that continues to be retained.

* * * * *